July 16, 1963

R. SCHALER 3,097,723

BRAKE MEANS FOR A CABLE RAILWAY CAR ASSEMBLY

Filed Sept. 5, 1962

INVENTOR.
RUDOLF SCHALER
By Kurt Kelman
AGENT

July 16, 1963    R. SCHALER    3,097,723
BRAKE MEANS FOR A CABLE RAILWAY CAR ASSEMBLY
Filed Sept. 5, 1962    2 Sheets-Sheet 2

INVENTOR.
RUDOLF SCHALER
By Kurt Kelman
AGENT

United States Patent Office 3,097,723
Patented July 16, 1963

3,097,723
BRAKE MEANS FOR A CABLE RAILWAY CAR ASSEMBLY
Rudolf Schaler, Linz, Austria, assignor to Vereinigte Österreichische Eisen- und Stahlwerke Aktiengesellschaft, Linz, Austria
Filed Sept. 5, 1962, Ser. No. 221,468
Claims priority, application Austria Sept. 28, 1961
9 Claims. (Cl. 188—42)

This invention relates to a carrying rope brake for cable railway cars, which brake comprises at least one brake shoe, which can be forced against the carrying cable by the force of a spring. Such brakes serve to hold the cable railway car, mainly intended for passenger traffic, in position on the carrying rope, e.g., if the haulage cable has broken. A known disadvantage of these carrying cable brakes resides in that their action is independent of the load of the car. For this reason, the braking force is always constant and when the load on the car is small the stopping distance in the case of an application of the carrying cable brake will be extremely short and high retardation values will be obtained so that the passengers in the cars may be seriously endangered.

To eliminate this disadvantage, braking devices controlled by the weight of the car have already been attempted. Generally, these structures provide for an automatic variation of the braking force available in dependence on the load and, if desired, on the inclination of the carrying cable. In most cases, no spring or another elastic pressure storage means is provided for the application of the brake but the loading weights themselves are applied to the brake, which is operated by the weight of the car; this is not permitted by the existing regulations for the construction of cable railways. On the other hand, a variation of an otherwise existing braking force in dependence on the load of the car is extremely difficult and involves a large structural expenditure, because a large force, which may amount to several tons, must be influenced.

It is also known to achieve a gradual increase of the braking pressure with the aid of damping devices. Any change or adjustment of the damping, however, will not be automatically effected in dependence on the car load. It is also no longer new to weaken the braking shock at higher speeds in that the braking force required is not applied at once, but in two successive phases, e.g., in that two identical carrying cable brakes having individual braking forces which correspond approximately to one half of the total braking force required, are applied in chronological succession. In this case too, however, there is no automatic change of the braking force as a function of time in dependence on the load of the car.

Finally, it is no longer new to suspend the cable railway car by a hydraulic or mechanical weighing device from the running gear and to cause the hydrostatic pressure effective in the weighing device or the force of the weighing spring to be measured or indicated. These means, however, serve only to enable a current check on the actual useful load and have not been used so far for the control of carrying cable brakes.

This invention has as its object to eliminate all these disadvantages and to provide a carrying cable brake in which the application of the braking force as a function of time, rather than the braking force itself, is influenced by the load of the car.

The invention resides essentially in that the cable railway car is suspended in a manner known per se from the running gear by a weighing device and a brake retarding device is provided which is automatically adjustable in dependence on the weighing pressure. Hence, the braking force remains always the same whereas the brake retarding device is so adjusted in dependence on the weighing pressure that a smaller load will result in an increased retardation or damping of the brake so that the passengers are protected from danger due to an excessively quick braking. The control of the retarding device does not require a large structural expenditure and large forces need not be transmitted. The connection from the weighing device to the brake retarding device may simply be provided by a conduit connected to the pressure chamber of the hydraulic weighing device or by a linkage connected in suitable manner to the weighing spring. Because a separate spring or a pressure storage means of other type is provided for the application of the brake and the braking is not effected by the weight of the car itself, the regulations existing in this respect are complied with.

In one embodiment of the basic idea of the invention, the brake spring is held stressed in a cylinder, filled with a pressure liquid, between one end wall of the cylinder and a piston which is displaceable in the cylinder and acts on the brake shoe, and the connecting conduit between the two ends of the piston includes a throttle valve, known per se, which is suitably spring-loaded and which is adjustable by the pressure liquid of the hydraulic weighing device or by a linkage from the mechanical weighing device, preferably a controlling slide valve for varying the cross-section of flow. During the piston movement which takes place under the action of the brake spring and causes the application of the brake, the pressure liquid in the cylinder must be displaced from one end of the piston to the other and it is obvious that this piston movement and with it the application of the brake shoe can be more or less retarded by a throttling of the cross-section of flow. This enables a load-dependent control of the operation of the brake to be effected with simple means.

In a development of the invention, a storage spring means consisting, e.g., of a set of plate springs, is interposed between the brake spring and the brake shoe. Without such storage spring means, the throttling might prevent a full contact for the brake shoes with the carrying cable at the beginning of the application of the brake so that the car would roll without being braked. The spring storage means ensure that the brake shoes will be immediately applied against the carrying cable when the brake is released for application and that the braking action will then gradually increase as determined by the retarded movement of the brake spring.

Other objects and advantages of the invention will hereinafter become more fully apparent from the following description of the annexed drawings which illustrate a preferred embodiment of the invention and wherein like reference characters indicate like parts or elements throughout the several views.

Figures 1, 2:
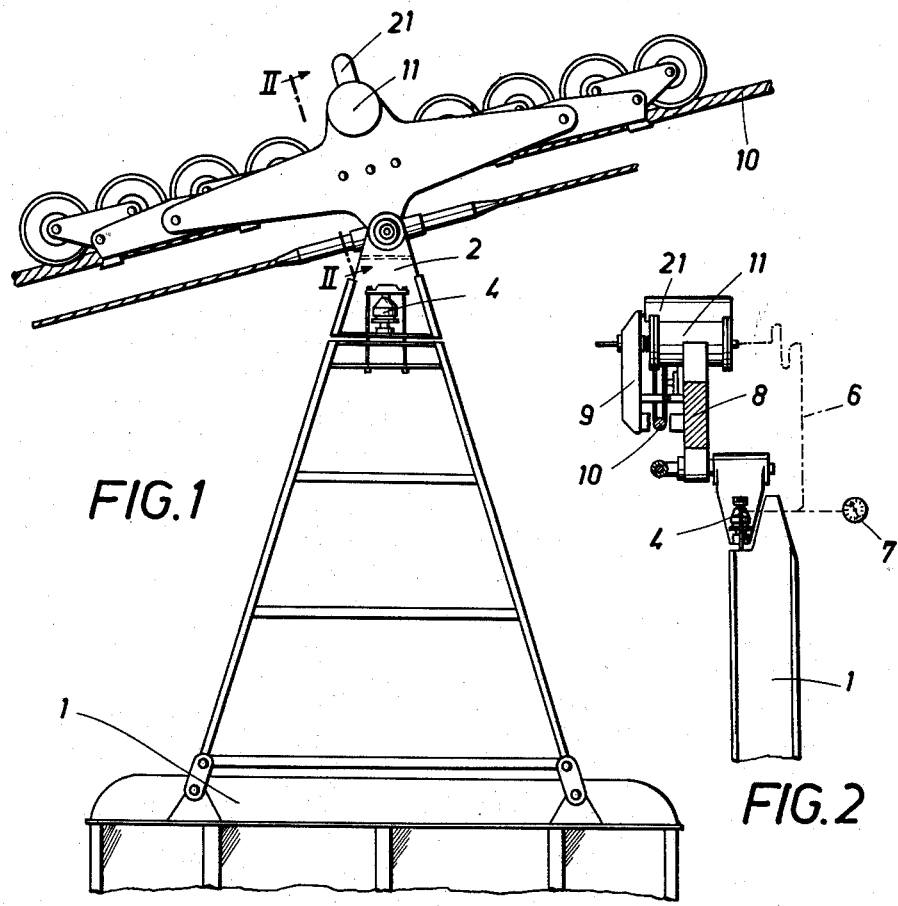
FIG. 1 shows in part a side elevation of a cable railway car embodying the present invention.
FIG. 2 is a view taken along section lines II—II of FIG. 1.
Figure 3:
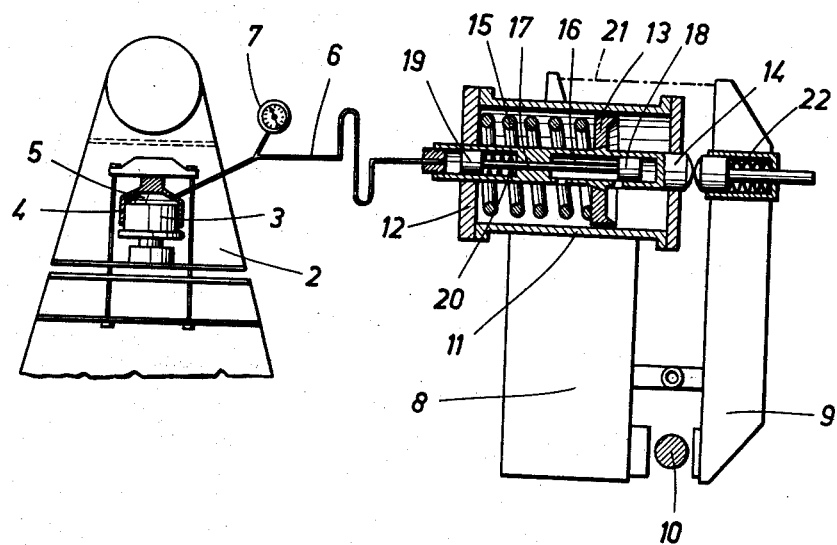
FIG. 3 is a detailed view of the preferred braking structure.

The cable railway car 1 is suspended from running gear 2 forming the top part of the suspension gear by a hydraulic weighing device, which consists of a piston 3 and a cylinder 4. A connecting conduit 6, to which a pressure gauge 7 is connected, leads from the pressure chamber 5 of this weighing device to the brake. The carrying cable brake consists of two shoes or jaws 8, 9, which are pivotally movable relative to each other and between which the carrying cable 10 is clamped. Cylinder 11 is filled with a hydraulic fluid. In this cylinder 11 the brake spring 15 is held stressed between one end wall 12 of the cylinder and a piston 13, which acts by means of a piston rod 14 on the brake jaw 9. A connecting conduit 16 formed by bores is provided between both ends of the piston. A controlling slide valve 17 is mounted in the piston rod 14 and with its piston end 18 more or less covers one bore. The other end of the slide valve forms also a piston 19. Pressure liquid is supplied from the hydraulic weighing device through conduit 6 to this piston 19 and acts against the force of a spring 20, the initial stress of which is also adjustable. An increase in the hydrostatic pressure in the weighing device will cause the slide valve 17 to be displaced to the right to further open the cross-section of flow of the connecting conduit 16 so that a release of the brake for application by means of the linkage 21, indicated with dash-and-dot lines, will cause the piston 13 to move with a smaller retardation or damping. On the other hand, if the weighing pressure is reduced, the controlling slide valve 17 will be displaced toward the left under the action of the spring 20 and the piston end 18 of the slide valve will reduce the cross-section of flow of the connecting conduit 16 so that a release of the brake for application will cause a stronger throttling of the transfer of the pressure liquid from one end of the piston 13 to the other and the braking operation will be retarded.

The piston 13, more particularly its piston rod 14, does not act directly on the brake jaw 9 but a spring storage means 22 is interposed. When the brake is released for application, the jaw 9 will immediately be applied against the carrying cable 10 under the action of the set of springs 22, whereafter the braking pressure is gradually increased under the action of the brake spring 15.

What is claimed is:

1. A cable railway car assembly which comprises a running gear adapted to be carried by and to run on a carrying cable, a cable railway car, a weighing device by which said car is suspended from said running gear, and a carrying cable brake having at least one brake shoe, brake applying means for applying said brake shoe with gradually increasing force against said carrying cable carrying said running gear, a brake retarding device arranged to retard the application of force on said brake shoe by said brake applying means, and adjusting means for adjusting the retarding effect of said brake retarding device, said adjusting means being operatively connected to said weighing device for automatically adjusting said retarding effect in dependence on said weighing device.

2. A cable railway car assembly as set forth in claim 1, in which said brake applying means comprise a spring.

3. A cable railway car assembly as set forth in claim 1, in which said weighing device is of hydraulic type.

4. A cable railway car assembly as set forth in claim 1, in which said brake applying means comprises a cylinder filled with hydraulic fluid and having an end wall remote from said brake shoe, a piston disposed in said cylinder to divide the same into two chambers and operatively connected to said brake shoe, and a spring held stressed in said cylinder between said end wall and said piston, and in which said retarding device comprises a conduit connecting said two chambers and an adjustable throttle valve incorporated in said conduit.

5. A cable railway car assembly as set forth in claim 4, in which said weighing device is of hydraulic type and said throttle valve is hydraulically adjustable and said adjusting means comprise a pressure conduit leading from said hydraulic weighing device to said throttle valve for adjustment thereof.

6. A cable railway car assembly as set forth in claim 4, in which said throttle valve is spring-loaded.

7. A cable railway car assembly as set forth in claim 4, in which said throttle valve consists of a slide valve adjustable to vary the cross-section of flow in said conduit.

8. A cable railway car assembly as set forth in claim 1, in which said brake applying means comprise a brake spring and a spring storage means operatively interposed between said brake spring and said brake shoe, said retarding device being arranged to retard the application of force on said brake shoe by said brake spring, whereas said spring storage means is adapted to act on said brake shoe so as to apply it against said carrying cable independently of said retarding device.

9. A cable railway car assembly as set forth in claim 8, in which said spring storage means comprises a set of plate springs.

No references cited.